（12） United States Patent
Chen

(10) Patent No.: US 10,326,301 B2
(45) Date of Patent: *Jun. 18, 2019

(54) TWO-LEVEL LED SECURITY LIGHT WITH MOTION SENSOR

(71) Applicant: Chia-Teh Chen, Taipei (TW)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,658

(22) Filed: Oct. 17, 2017

(65) Prior Publication Data

US 2018/0042080 A1 Feb. 8, 2018

Related U.S. Application Data

(60) Continuation of application No. 15/375,777, filed on Dec. 12, 2016, now Pat. No. 9,826,590, which is a
(Continued)

(51) Int. Cl.
*H05B 37/02* (2006.01)
*H02J 7/35* (2006.01)
(Continued)

(52) U.S. Cl.
CPC .............. *H02J 7/35* (2013.01); *F21S 9/03* (2013.01); *F21V 17/02* (2013.01); *G08B 5/36* (2013.01); *G08B 13/1895* (2013.01); *G08B 15/00* (2013.01); *G08B 15/002* (2013.01); *H05B 33/083* (2013.01); *H05B 33/0809* (2013.01); *H05B 33/0815* (2013.01); *H05B 33/0818* (2013.01); *H05B 33/0824* (2013.01);

*H05B 33/0827* (2013.01); *H05B 33/0854* (2013.01); *H05B 33/0872* (2013.01); *H05B 37/02* (2013.01); *H05B 37/0218* (2013.01);
(Continued)

(58) Field of Classification Search
CPC ............ H05B 33/0815; H05B 33/0824; H05B 33/083; H05B 33/0845; H05B 33/0854; H05B 33/0872; H05B 37/0218; H05B 37/0227; H05B 37/0281
USPC ................ 315/149, 152, 154, 307, 308, 312
See application file for complete search history.

(56) References Cited

U.S. PATENT DOCUMENTS 5,134,387 A 7/1992 Smith et al.
5,598,066 A 1/1997 Wiesemann et al.
(Continued)

*Primary Examiner* — Tung X Le
(74) *Attorney, Agent, or Firm* — Rosenberg, Klein & Lee

(57) ABSTRACT

A two-level LED security light with a motion sensor. At night, the LED security light is turned on for a low level illumination. When the motion sensor detects any intrusion, the LED security light is switched from the low level illumination to a high level illumination for a short duration time and then returns to the low level illumination for saving energy. The LED security light includes a power supply unit, a light sensing control unit, a motion sensing unit, a loading and power control unit, and a lighting-emitting unit and at least one external control unit electrically coupled to a controller of the loading and power control unit to receive and convert at least an external control signal into a message signal interpretable by the controller for adjusting at least an operating parameter or changing at least an illumination mode of the two-level LED security light.

76 Claims, 9 Drawing Sheets

Related U.S. Application Data continuation of application No. 14/836,000, filed on Aug. 26, 2015, now Pat. No. 9,622,325, which is a division of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.
    *H05B 33/08*     (2006.01)
    *G08B 15/00*     (2006.01)
    *H05B 39/04*     (2006.01)
    *F21S 9/03*     (2006.01)
    *F21V 17/02*     (2006.01)
    *G08B 5/36*     (2006.01)
    *G08B 13/189*     (2006.01)
    *F21Y 115/10*     (2016.01)
    *G08B 13/00*     (2006.01)

(52) U.S. Cl.
    CPC ..... *H05B 37/0227* (2013.01); *H05B 37/0281* (2013.01); *H05B 39/042* (2013.01); *H05B 39/044* (2013.01); *F21Y 2115/10* (2016.08); *G08B 13/00* (2013.01); *G08B 13/189* (2013.01); *Y02B 20/40* (2013.01); *Y02B 20/44* (2013.01); *Y02B 20/46* (2013.01)

(56) References Cited

U.S. PATENT DOCUMENTS

| | | | |
|---|---|---|---|
| 5,747,937 A | 5/1998 | Wiesemann et al. | |
| 5,946,209 A * | 8/1999 | Eckel | H01H 47/007 315/159 |
| 6,016,038 A | 1/2000 | Mueller et al. | |
| 6,211,626 B1 | 4/2001 | Lys et al. | |
| 6,225,748 B1 | 5/2001 | Evans et al. | |
| 6,548,967 B1 | 4/2003 | Dowling et al. | |
| 6,888,323 B1 | 5/2005 | Null et al. | |
| 6,909,239 B2 | 6/2005 | Gauna | |
| 6,927,541 B2 | 8/2005 | Lee | |
| 7,086,756 B2 | 8/2006 | Maxik | |
| 7,088,059 B2 | 8/2006 | McKinney et al. | |
| 7,122,976 B1 | 10/2006 | Null et al. | |
| 7,268,497 B2 | 9/2007 | Hsieh | |
| 7,344,275 B2 | 3/2008 | Allen et al. | |
| 7,405,524 B2 | 7/2008 | Null et al. | |
| 7,564,198 B2 | 7/2009 | Yamamoto et al. | |
| 7,804,252 B2 | 9/2010 | Chen | |
| 8,159,125 B2 | 4/2012 | Miao | |
| 8,194,061 B2 | 6/2012 | Wang et al. | |
| 8,436,542 B2 * | 5/2013 | Middleton-White | H05B 37/0245 315/152 |
| 8,476,836 B2 | 7/2013 | Van De Ven et al. | |
| 8,581,517 B2 * | 11/2013 | Kuo | H05B 33/0845 315/209 R |
| 8,598,805 B2 | 12/2013 | Tremblay et al. | |
| 8,928,252 B2 * | 1/2015 | Blaha | H02M 7/217 315/185 R |
| 9,084,310 B2 * | 7/2015 | Bedell | H05B 37/0227 |
| 9,271,345 B2 | 2/2016 | Welten | |
| 9,345,112 B2 | 5/2016 | Chen | |
| 9,497,834 B2 | 11/2016 | Chen | |
| 9,795,008 B2 | 10/2017 | Chen | |
| 2005/0007025 A1 | 1/2005 | Gauna | |
| 2005/0259416 A1 | 11/2005 | Gauna et al. | |
| 2006/0022916 A1 | 2/2006 | Aiello | |
| 2007/0182338 A1 | 8/2007 | Shteynberg et al. | |
| 2008/0197783 A1 | 8/2008 | Chen | |
| 2010/0244706 A1 * | 9/2010 | Steiner | G01J 1/02 315/149 |
| 2011/0025217 A1 * | 2/2011 | Zhan | H02M 3/335 315/219 |
| 2014/0062313 A1 | 3/2014 | Ootsubo et al. | |
| 2014/0210362 A1 | 7/2014 | Shin et al. | |
| 2015/0289339 A1 | 10/2015 | Wu et al. | |

* cited by examiner

TWO-LEVEL LED SECURITY LIGHT WITH MOTION SENSOR

CROSS-REFERENCE TO RELATED APPLICATION

This is a continuation application of prior application Ser. No. 15/375,777, filed on 12 Dec. 2016, currently pending. Ser. No. 15/375,777 is a continuation application of prior application Ser. No. 14/836,000 filed on 26 Aug. 2015, which issued as U.S. Pat. No. 9,622,325, and which is a divisional application of Ser. No. 14/478,150, filed on 5 Sep. 2014, and entitled A TWO-LEVEL LED SECURITY LIGHT WITH MOTION SENSOR, issued as U.S. Pat. No. 9,445,474, which is a continuation application of Ser. No. 13/222,090, filed 31 Aug. 2011, which issued as U.S. Pat. No. 8,866,392 on 21 Oct. 2014.

BACKGROUND OF THE INVENTION

1. Technical Field

The present disclosure relates to a lighting apparatus, in particular, to a two-level security LED light with motion sensor 2. Description of Related Art Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY OF THE INVENTION

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that the ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that the ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes a phase controller and one or a plurality of parallel-connected alternating current (AC)LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto-turnoff at dawn. The PC mode may generate a high level illumination for a predetermined duration then automatically switch to the PS mode by a control unit to generate a low level illumination. When the motion sensor detects a human motion, the disclosed LED security light may immediate switch to the high level illumination for a short predetermined duration thereby achieve illumination or warning effect. After the short predetermined duration, the LED security light may automatically return to the low level illumination for saving energy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF PREFERRED EMBODIMENTS

Figure 1:
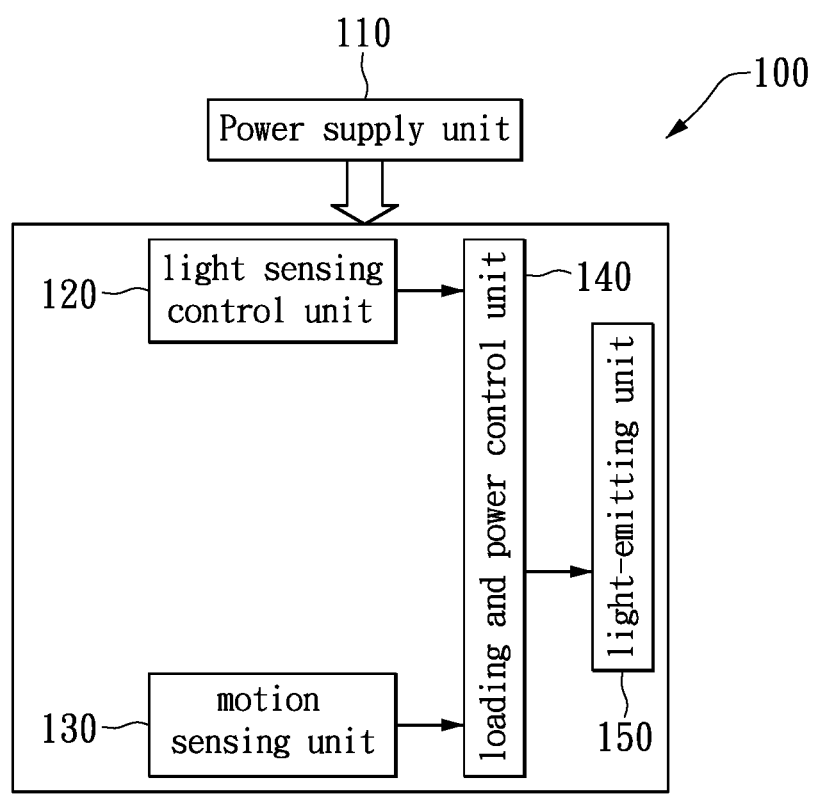
FIG. 1 schematically illustrates a block diagram of a two-level LED security light in accordance with an exemplary embodiment of the present disclosure.

Reference is made in detail to the exemplary embodiments of the present disclosure, examples of which are illustrated in the accompanying drawings. Wherever possible, the same reference numbers are used in the drawings and the description to refer to the same or alike parts.

(First Exemplary Embodiment)

Refer to FIG. 1, which schematically illustrates a block diagram of a two-level LED security light in accordance to the first exemplary embodiment of the present disclosure. A two-level LED security light (herein as the lighting apparatus)100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs and switching components. The loading and power control unit 140 may control the light-emitting unit 150 to generate at least two levels of illumination variations.

When the light sensing control unit 120 detects that the ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flow through the light-emitting unit 150, to generate the high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto.

Figure 2A:
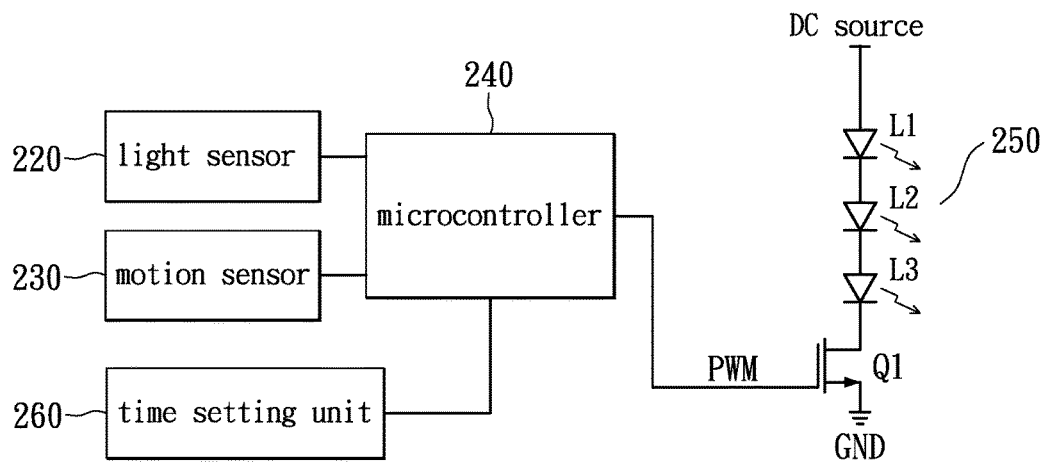
FIG. 2A illustrates a schematic diagram of a two-level LED security light in accordance to the first exemplary embodiment of the present disclosure.
Figure 2B:
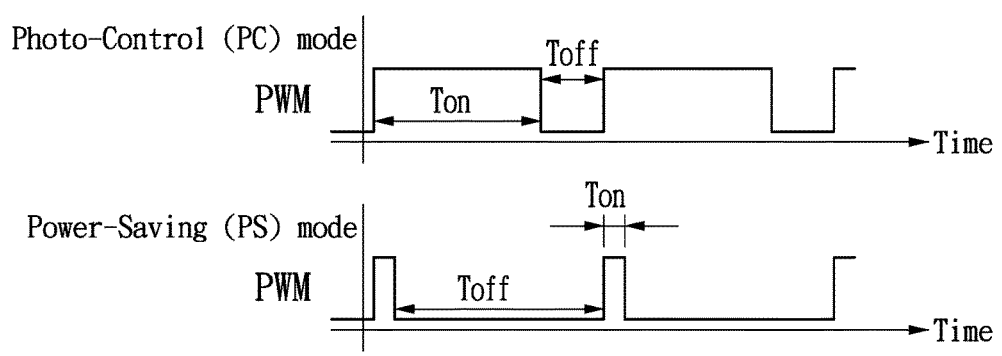
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{off}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow the user to configure the predetermined duration associated with the high level illumination in the PC mode, however the present disclosure is not limited thereto. The time setting unit is a type of external control units designed to detect various external control signals and to convert the various external control signals into various message signals interpretable by the controller for setting various operating parameters of security light including at least a time length setting for various illumination modes, a light intensity setting for various illumination modes and switching between illumination modes. The external control units may be configured with a push button, a touch sensor, a voltage divider, a power interruption detection circuitry or a wireless remote control receiver for generating message signals interpretable by the controller.

(Second Exemplary Embodiment)

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
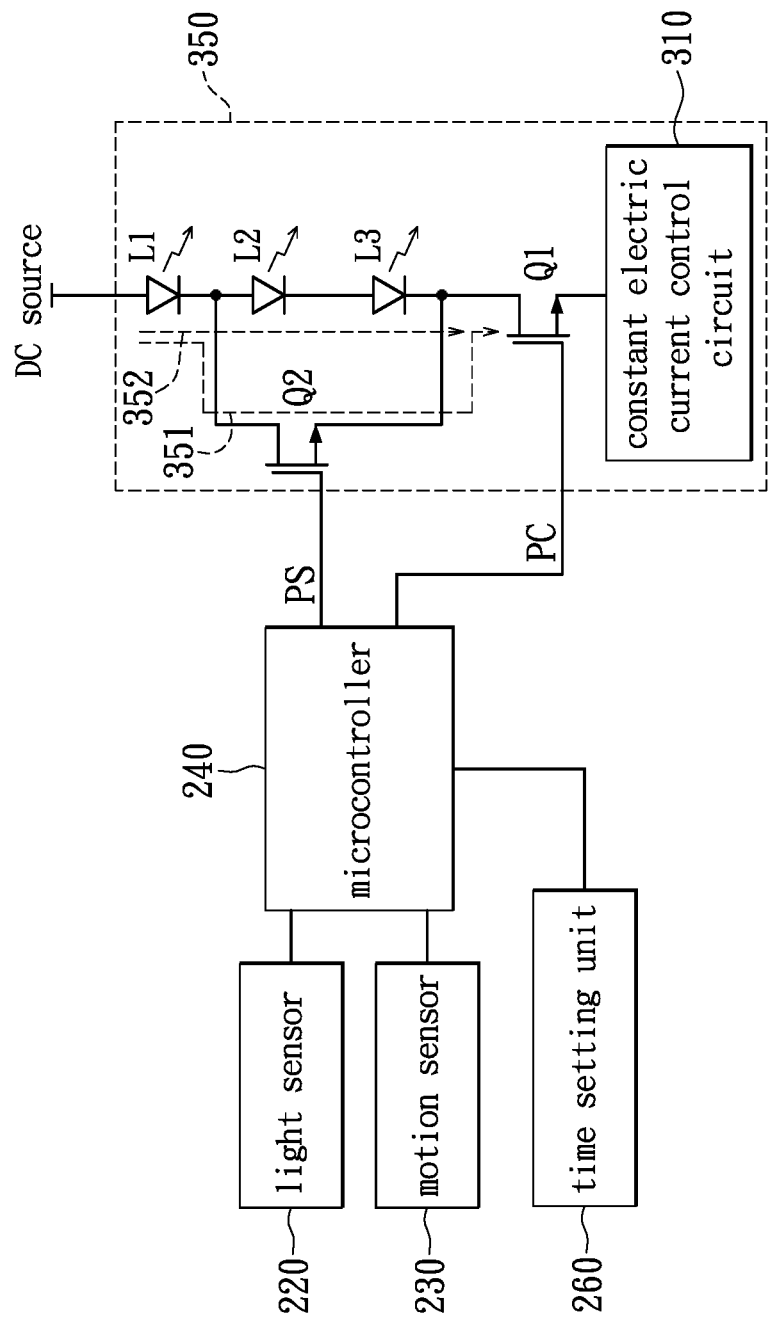
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
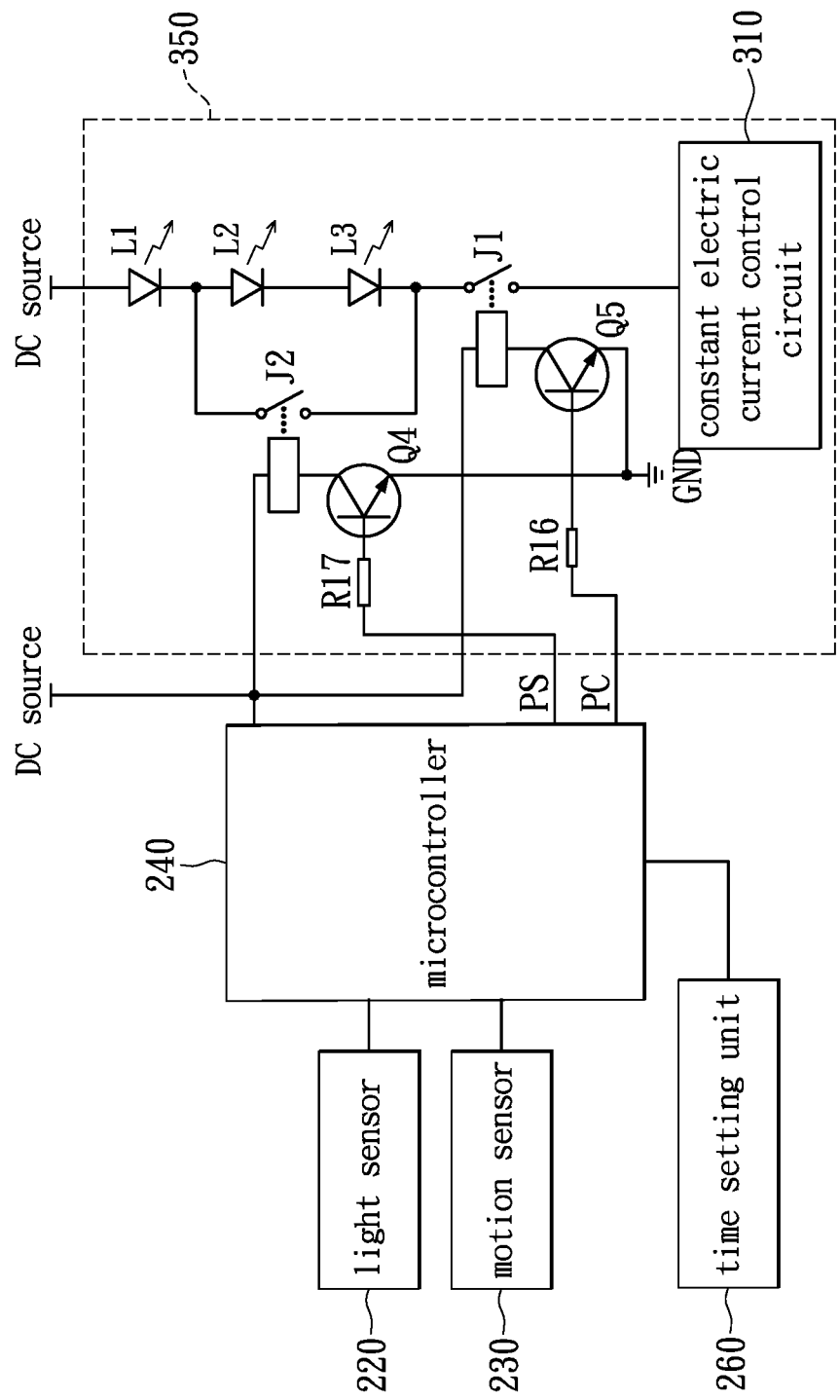
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700K while the LEDs L2 and L3 may adopt LEDs having color temperature of 5000K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

(Third Exemplary Embodiment)

Refer back to FIG. 1, wherein the light-emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
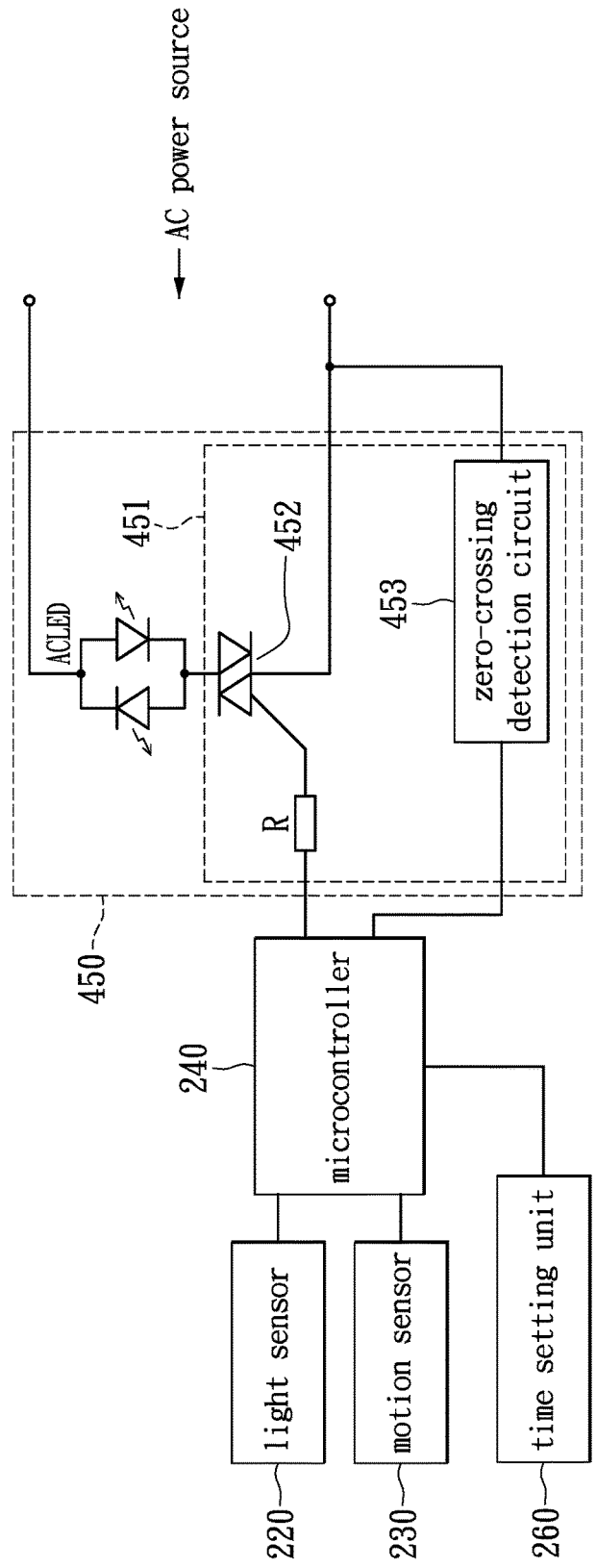
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 includes a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < 1/2f - t_o$ for a light-source load with a cut-in voltage $V_t$, wherein $t_o = (1/2\pi f)\sin^{-1}(V_t/V_m)$. The described criterion is applicable to all types of ACLEDs to assure that the triac 452 can be stably triggered in both positive and negative half cycle of the AC power source. Take ACLED with $V_t(rms)=80V$ as an example, and supposing the $V_m(rms)=110V$ and f=60 Hz, then $t_o=2.2$ ms and $(1/2f)=8.3$ ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms$<t_D<$6.1 ms.

Figure 4B:
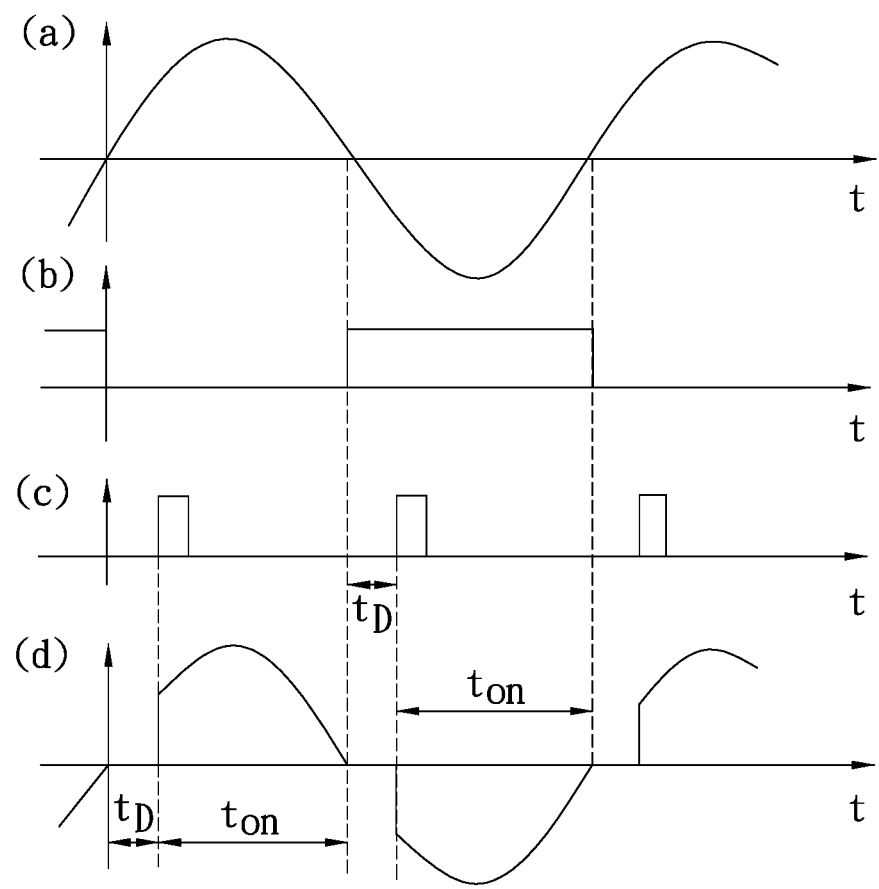
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
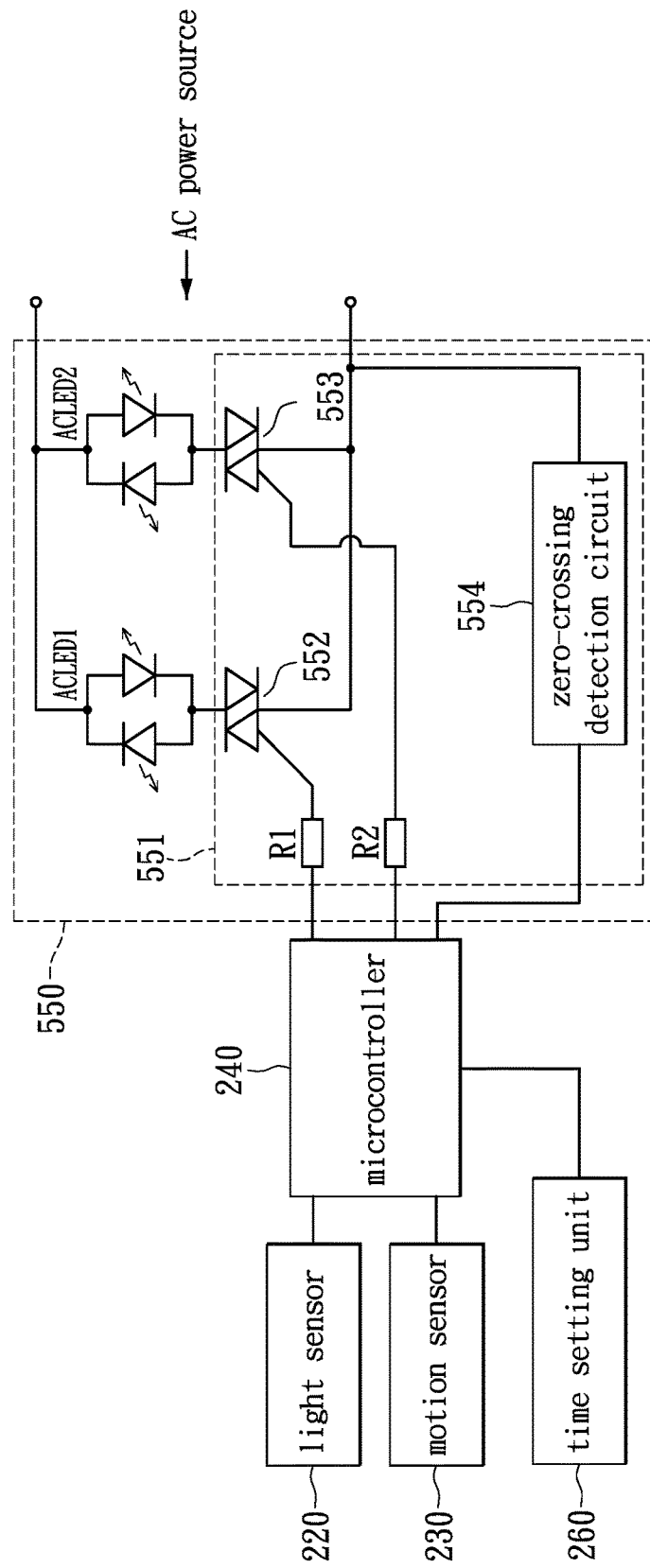
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistorsR1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

(Fourth Exemplary Embodiment)

Figure 6:
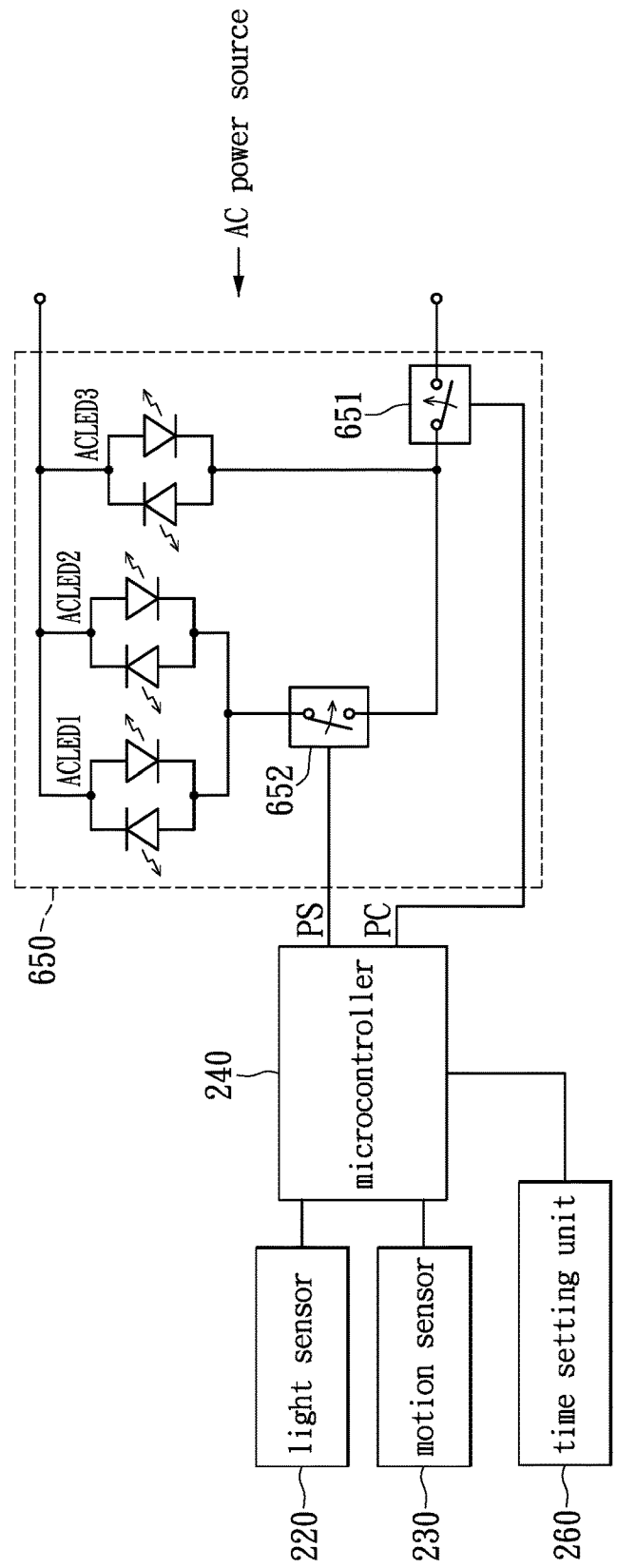
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having color temperature of 5000K. The ACLED3 may be a low power lighting source having color temperature of 2700K. Consequently, the ACLED may generate two levels of illuminations with high illumination and hue contrast without using a zero-crossing detection circuit.

(Fifth Exemplary Embodiment)

Figure 7:
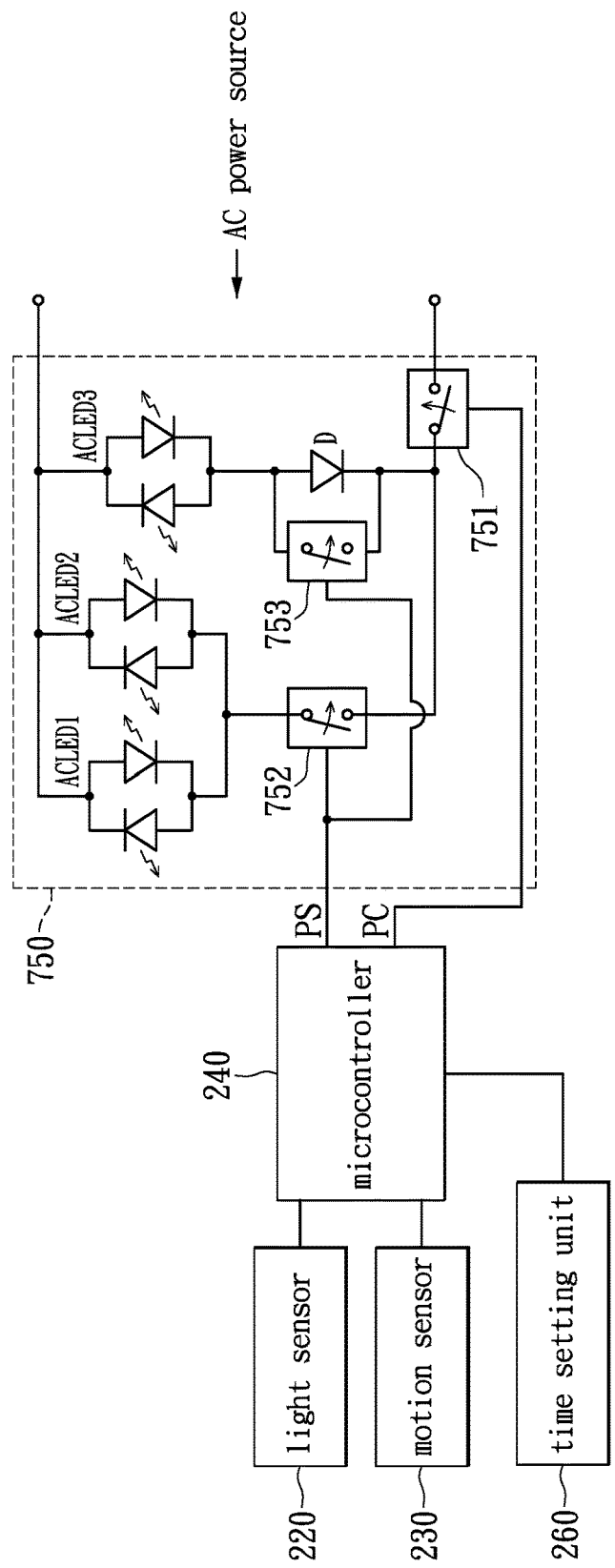
FIG. 7 illustrates a schematic diagram of a two-level LED security light in accordance to the fifth exemplary embodiment of the present disclosure.

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753.If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A two-level LED security light comprising:
    a light-emitting unit;
    a loading and power control unit;
    a light sensing control unit;
    a motion sensing unit;
    a power supply unit; and
    at least one external control unit;
    wherein the light-emitting unit comprises a plurality of LEDs divided into two sets of LEDs with a first set of the light-emitting unit having N number LEDs and a second set of the light-emitting unit having M number LEDs, wherein N and M are positive integers;
    wherein the loading and power control unit comprises a controller and at least two switching devices including at least one first switching device and at least one second switching device, wherein the controller is electrically coupled to the light sensing control unit, the motion sensing unit and the at least two switching devices;
    wherein the at least one first switching device and the at least one second switching device are respectively and electrically coupled with the first set of the light-emitting unit and the second set of the light-emitting unit, wherein the at least one first switching device and the at least one second switching device are controlled by the controller to be conducting or cut-off to perform at least a first switching mode and a second switching mode respectively;
    wherein in the first switching mode the controller outputs at least a first control signal to turn on the first set of the light-emitting unit to perform a low level illumination mode characterized by a first light intensity and in the second switching mode the controller outputs at least a second control signal to turn on the second set of the light-emitting unit to perform a high level illumination mode characterized by a second light intensity, wherein the second light intensity is higher than the first light intensity;
    wherein when an ambient light detected by the light sensing control unit is lower than a first predetermined value, the loading and power control unit manages to operate the first switching mode to turn on the first set of the light-emitting unit for performing the low level illumination mode with the first light intensity;
    wherein when the ambient light detected by the light sensing control unit is higher than a second predetermined value, the loading and power control unit manages to turn off all the LEDs in the light-emitting unit;
    wherein when a motion signal is detected by the motion sensing unit, the loading and power control unit manages to operate at least the second switching mode to turn on the second set of the light-emitting unit to perform a high level illumination mode with a second light intensity for a predetermined time duration before resuming to the low level illumination mode with the first light intensity; and
    wherein the at least one external control unit is electrically coupled to the controller for adjusting at least one of the first light intensity, the second light intensity or the predetermined duration, or for switching at least from one performance mode to a different performance mode characterized with different light intensities.

2. The two-level LED security light according to claim 1, wherein when the second set of the light-emitting unit is turned on upon detecting the motion intrusion, the loading and power control unit continues to turn on the first set of the light-emitting unit.

3. The two-level LED security light according to claim 1, wherein when the second set of the light-emitting unit is turned on upon detecting the motion intrusion the loading and power control unit manages to turn off the first set of the light-emitting unit.

4. The two-level LED security light according to claim 1, wherein the power supply unit outputs at least one DC power for operating the two-level LED security light, wherein the first set of the light-emitting unit and the second set of the light-emitting unit are connected in series, wherein the first switching device is electrically connected in parallel with the second set of the light-emitting unit, wherein the second switching device is electrically connected in parallel with the first set of the light-emitting unit; wherein a control circuit is configured in the power supply unit to control a constant electric current passing through LEDs such that an electric current level for driving the LEDs remains stable in light of a drastic change of lighting load between driving the N number LEDs for generating the low level illumination and driving at least the M number LEDs for generating the high level illumination.

5. The two-level LED security light according to claim 4, wherein when the light-emitting unit is in the low level illumination mode with the N number LEDs in a conduction state, the first light intensity is further adjustable by the controller; wherein the first set of the light-emitting unit is configured to include a plurality of switching devices coupled to the two ends associated with each LED and to the controller, wherein the controller is configured to control the number of LEDs to be turned on in the N number LEDs through bypassing unwanted LEDs in the N number LEDs with the associated switching device(s) according to an external control signal received from the external control unit; and wherein the external control unit is a push button device, a voltage divider or a wireless remote control receiver.

6. The two-level LED security light according to claim 4, wherein the loading and power control unit further comprises a third switching device controlled by the controller and electrically coupled in series with the light-emitting unit and the power supply unit for controlling a conduction or a cutoff of the light-emitting unit, wherein when the light-emitting unit is in the low level illumination mode with the first set of the light-emitting unit in a conduction state, the first light intensity is further adjustable by the controller; wherein the controller in response to an external control signal received from the external control unit outputs a PWM signal to control a time length of conduction period of the third switching device in each duty cycle of the PWM signal such that an average electric power proportional to the time length of conduction period is delivered to the light-emitting unit for performing a dimming work of the low level illumination; and wherein the external control unit is a push button device, a voltage divider or a wireless remote control receiver.

7. The two-level LED security light according to claim 4, wherein when the light-emitting unit is in the high level illumination mode, the second light intensity is further adjustable by the controller, wherein the second set of the light-emitting unit is configured to include a plurality of switching devices coupled to the two ends associated with each LED and to the controller, wherein the controller is configured to control the number of LEDs to be turned on in the M number LEDs through bypassing unwanted LEDs in the M number LEDs with the associated switching device(s) according to an external control signal received from the external control unit; and wherein the external control unit is a push button device, a voltage divider or a wireless remote control receiver.

8. The two-level LED security light according to claim 4, wherein the loading and power control unit further comprises a third switching device controlled by the controller and electrically coupled in series with the light-emitting unit and the power supply unit for controlling a conduction or a cutoff of the light-emitting unit, wherein when the light-emitting unit is in the high level illumination mode, the second light intensity is further adjustable by the controller; wherein the controller in response to an external control signal received from the external control unit outputs a PWM signal to control a time length of conduction period of the third switching device in each duty cycle of the PWM signal such that an average electric power proportional to the time length of conduction period is delivered to the light-emitting unit for performing a dimming work of the high level illumination; and wherein the external control unit is a push button device, a voltage divider or a wireless remote control receiver.

9. The two-level LED security light according to claim 1, wherein the power supply unit outputs at least one DC power for operating the two-level LED security light, wherein the first set of the light-emitting unit and the second set of the light-emitting unit are electrically connected in series; wherein the first switching device is electrically connected in parallel with the second set of the light-emitting unit and the second switching device is electrically connected between the power supply unit and the light-emitting unit; wherein when the first switching mode is performed, the first switching device is conducted for bypassing the second set of the light-emitting unit and the second switching device is conducted for turning on the light-emitting unit for generating the low level illumination; wherein when the second switching mode is performed, the first switching device is cutoff and the second switching device is conducted for turning on the light-emitting unit for generating the high level illumination; wherein a control circuit is configured in the power supply unit to control a constant electric current passing through LEDs such that an electric current level for driving the LEDs remains stable in light of a drastic change of lighting load between driving the N number LEDs for generating the low level illumination and driving at least the M number LEDs for generating the high level illumination.

10. The two level LED security light according to claim 9, wherein when the first switching mode is performed, the first light intensity of the low level illumination mode is further adjustable by the controller, wherein the controller in response to an external control signal received from the external control unit outputs a PWM signal to control a time length of conduction period of the second switching device in each duty cycle of the PWM signal such that an average electric power proportional to the time length of conduction period is delivered to the light-emitting unit for performing a dimming work of the low level illumination mode; and wherein the external control unit is a push button device, a voltage divider or a wireless remote control receiver.

11. The two level LED security light according to claim 9, wherein. when the second switching mode is performed, the second light intensity of the high level illumination mode is further adjustable by the controller, wherein the controller in response to an external control signal received from the external control unit outputs a PWM signal to control a time length of conduction period of the second switching device in each duty cycle of the PWM signal such that an average electric power proportional to the time length of conduction period is delivered to the light-emitting unit for performing a dimming work of the high level illumination; and wherein the external control unit is a push button device, a voltage divider or a wireless remote control receiver.

12. The two-level LED security light according to claim 1, wherein the power supply unit outputs at least one DC power for operating the two-level LED security light; wherein the first set of the light-emitting unit and the second set of the light-emitting unit are connected in parallel, wherein the first switching device is electrically connected in series between the first set of the light-emitting unit and the power supply unit, wherein the second switching device is electrically connected in series between the second set of the light-emitting unit and the power supply unit; wherein the N number LEDs of the first set of the light-emitting unit and the M number LEDs of the second set of the light-emitting unit are respectively designed with a configuration of in series and/or in parallel connections such that when incorporated with an adequate level setting of the at least one DC power, an electric current passing through each LED of the M number LEDs and each LED of the N number LEDs remains at an adequate level such that a voltage V across each LED complies with an operating constraint of $V_{th} < V < V_{max}$ featuring electrical characteristics of a LED, where $V_{th}$ is a threshold voltage required to trigger the LED to start emitting light and $V_{max}$ is a maximum operating voltage across each LED to avoid an effect of a thermal runaway which results in burning out the LED or damaging an LED construction resulting in a shortened LED lifetime.

13. The two-level LED security light according to claim 12, wherein when the first set of the light-emitting unit is in a conduction state, the first light intensity is further adjustable by the controller; wherein the first set of the light-emitting unit is configured to include a plurality of switching devices coupled to the two ends associated with each LED and to the controller, wherein the controller is configured to control the number of LEDs to be turned on in the N number LEDs through bypassing unwanted LEDs in the N number LEDs with the associated switching device(s) according to an external control signal received from the external control unit; and wherein the external control unit is a push button device, a voltage divider or a wireless remote control receiver.

14. The two-level LED security light according to claim 12, wherein when the first set of the light-emitting unit is in a conduction state, the first light intensity of the light emitting unit is further adjustable by the controller;
wherein the controller in response to an external control signal received from the external control unit outputs a PWM signal to control a time length of conduction period of the first switching device in each duty cycle of the PWM signal such that an average electric power proportional to the time length of conduction period is delivered to the first set of the light-emitting unit for performing a dimming work of the low level illumination mode.

15. The two-level LED security light according to claim 12, wherein when the second set of the light-emitting unit is in a conduction state, the second light intensity is further adjustable by the controller, wherein the second set of the light-emitting unit is configured to include a plurality of switching devices coupled to the two ends associated with each LED and to the controller, wherein the controller is configured to control the number of LEDs to be turned on in the M number LEDs through bypassing unwanted LEDs in the M number LEDs with the associated switching device(s) according to an external control signal received from the external control unit; and wherein the external control unit is a push button device, a voltage divider or a wireless remote control receiver.

16. The two-level LED security light according to claim 12, wherein when the second set of the light-emitting unit is in a conduction state, the second light intensity of the light-emitting unit is further adjustable by the controller; wherein the controller in response to an external control signal received from the external control unit outputs a PWM signal to control a time length of conduction period of the second switching device in each duty cycle of the PWM signal such that an average electric power proportional to the time length of conduction period is delivered to the second set of the light-emitting unit for performing a dimming work of the high level illumination mode.

17. The two-level LED security light according to claim 1, wherein the external control unit is a power interruption detection circuitry electrically coupled to the controller for detecting a short power interruption signal; wherein when the short power interruption signal is detected, the controller operates to alternately perform one of the high level illumination mode and the motion sensing illumination mode, wherein in the high level illumination mode the motion sensing unit is temporarily deactivated, and wherein in the motion sensing illumination mode the motion sensing unit is activated.

18. The two level LED security light according to claim 1, wherein the external control unit is a power interruption detection circuitry electrically coupled to the controller for detecting a short power interruption signal; wherein when the short power interruption signal is detected, the controller operates to alternately perform one of the low level illumination mode and the motion sensing illumination mode, wherein in the low level illumination mode the motion sensing unit is temporarily deactivated, and wherein in the motion sensing illumination mode the motion sensing unit is activated.

19. The two level LED security light according to claim 1, wherein the external control unit is a power interruption detection circuitry electrically coupled to the controller for detecting a short power interruption signal; wherein when the short power interruption signal is detected, the controller operates to alternately perform one of the low level illumination mode, the high level illumination mode and the motion sensing illumination mode according to a sequence of the short power interruption signals received, wherein in the low level illumination mode or the high level illumination mode the motion sensing unit is temporarily deactivated, and wherein in the motion sensing illumination mode the motion sensing unit is activated.

20. A two-level LED security light comprising:
a light-emitting unit;
a loading and power control unit;
a light sensing control unit;
a motion sensing unit;
a power supply unit; and
at least one external control unit;
wherein the light-emitting unit comprises a plurality of LEDs divided into two sets of LEDs with a first set of the light-emitting unit having N number LEDs and a second set of the light-emitting unit having M number LEDs; wherein the N number LEDs are of a low color temperature to produce a soft light while the M number LEDs are of a high color temperature to produce a bright light, wherein N and M are positive integers;
wherein the loading and power control unit comprises a controller electrically coupled to the light sensing control unit, the motion sensing unit and at least two switching devices including at least one first switching device and at least one second switching device;
wherein the at least one first switching device and the at least one second switching device are respectively and electrically coupled with the first set of the light-emitting unit and the second set of the light-emitting unit;
wherein the two switching devices are controlled by the controller to be respectively conducting or cut-off to perform at least respectively a first switching mode and a second switching mode;
wherein in the first switching mode at least the first set of the light-emitting unit is switched on and in the second switching mode at least the second set of the light-emitting unit is switched on;
wherein when an ambient light detected by the light sensing control unit is lower than a first predetermined value, the loading and power control unit manages to activate at least the first switching mode to perform a first illumination mode emitting light characterized by a first light intensity and a low color temperature;
wherein when the ambient light detected by the light sensing control unit is higher than a second predetermined value, the loading and power control unit manages to turn off all the LEDs in the light-emitting unit;
wherein when a motion signal is detected by the motion sensing unit, the loading and power control unit manages to activate at least the second switching mode to perform a second illumination mode emitting light characterized by a second light intensity and a high color temperature for a predetermined duration, wherein the second light intensity is higher than the first light intensity; and wherein the external control unit is electrically coupled to the controller for adjusting at least one operating parameter of the first light intensity, the second light intensity, the low color temperature, or the high color temperature, or for switching from one performance mode to another performance mode characterized by a different lighting intensity and/or a different color temperature.

21. The two-level LED security light according to claim 20, wherein when the second set of the light-emitting unit is turned on upon detecting the motion signal, the loading and power control unit continues to turn on the first set of the light-emitting unit to perform the second illumination mode.

22. The two-level LED security light according to claim 20, wherein when the second set of the light-emitting unit is turned on upon detecting the motion signal, the loading and power control unit manages to turn off the first set of the light-emitting unit to perform the second illumination mode.

23. The two-level LED security light according to claim 20, wherein the power supply unit outputs at least one DC power for operating the two-level LED security light, wherein the first set of the light-emitting unit and the second set of the light-emitting unit are connected in series, wherein the first switching device is electrically connected in parallel with the second set of the light-emitting unit and the second switching device is electrically connected in parallel with the first set of the light-emitting unit, wherein a control circuit is configured in the power supply unit to control a constant electric current passing through LEDs such that an electric current level for driving the LEDs remains stable in light of a drastic change of lighting load between driving the N number LEDs and driving at least the M number LEDs respectively for performing the first illumination mode and the second illumination mode.

24. The two-level LED security light according to claim 23, wherein when the light-emitting unit is in the first illumination mode, the first light intensity is further adjustable by the controller;

wherein the first set of the light-emitting unit is configured to include a plurality of switching devices coupled to the two ends associated with each LED and to the controller, wherein the controller is configured to control the number of LEDs to be turned on in the N number LEDs through bypassing unwanted LEDs in the N number LEDs with the associated switching device(s) according to an external control signal played by a user or according to a value of a voltage divider set by the user.

25. The two-level LED security light according to claim 23, wherein the loading and power control unit further comprises a third switching device controlled by the controller and electrically coupled in series with the light-emitting unit and the power supply unit for controlling a conduction or a cutoff of the light-emitting unit, wherein when the light-emitting unit is in the first illumination mode, the first light intensity is further adjustable by the controller; wherein the controller in response to an external control signal played by a user outputs a PWM signal to control a time length of conduction period of the third switching device in each duty cycle of the PWM signal such that an average electric power proportional to the time length of conduction period is delivered to the first set of the light-emitting unit for performing a dimming work of the first illumination mode.

26. The two-level LED security light according to claim 23, wherein when the light-emitting unit is in the second illumination mode, the second light intensity is further adjustable by the controller, wherein the second set of the light-emitting unit is configured to include a plurality of switching devices coupled to the two ends associated with each LED and to the controller, wherein the controller is configured to control the number of LEDs to be turned on in the M number LEDs through bypassing unwanted LEDs in the M number LEDs with the associated switching device(s) according to an external control signal played by a user or according to a value of a voltage divider set by the user.

27. The two-level LED security light according to claim 23, wherein the loading and power control unit further comprises a third switching device controlled by the controller and electrically coupled in series with the light-emitting unit and the power supply unit for controlling a conduction or a cutoff of the light-emitting unit, wherein when the light-emitting unit is in the second illumination mode, the second light intensity is further adjustable by the controller; wherein the controller in response to an external control signal played by a user outputs a PWM signal to control a time length of conduction period of the third switching device in each duty cycle of the PWM signal such that an average electric power proportional to the time length of conduction period is delivered to the light emitting unit for performing a dimming work of the second illumination mode.

28. The two-level LED security light according to claim 20, wherein the power supply unit outputs at least one DC power for operating the two-level LED security light, wherein the first set of the light-emitting unit and the second set of the light-emitting unit are electrically connected in series; wherein the first switching device is electrically connected in parallel with the second set of the light-emitting unit and the second switching device is electrically connected between the power supply unit and the light-emitting unit; wherein when the first switching mode is performed, the first switching device is conducted for bypassing the second set of the light-emitting unit and the second switching device is conducted for turning on the light-emitting unit for performing the first illumination mode; wherein when the second switching mode is performed, the first switching device is cutoff and the second switching device is conducted for turning on the light-emitting unit for performing the second illumination mode; wherein a control circuit is configured in the power supply unit to control a constant electric current passing through LEDs such that an electric current level for driving the LEDs remains stable in light of a drastic change of lighting load between driving the N number LEDs for performing the first illumination mode and driving at least the M number LEDs for performing the second illumination mode.

29. The two-level LED security light according to claim 28, wherein when the first switching mode is performed, the first light intensity of the first illumination mode is further adjustable by the controller, wherein the controller in response to an external control signal received from the external control unit outputs a PWM signal to control a time length of conduction period of the second switching device in each duty cycle of the PWM signal such that an average electric power proportional to the time length of conduction period is delivered to the light-emitting unit for performing a dimming work of the first illumination mode; and wherein the external control unit is a push button device, a voltage divider or a wireless remote control receiver.

30. The two-level LED security light according to claim 28, wherein when the second switching mode is performed, the second light intensity of the second illumination mode is further adjustable by the controller, wherein the controller in response to an external control signal received from the external control unit outputs a PWM signal to control a time length of conduction period of the second switching device in each duty cycle of the PWM signal such that an average electric power proportional to the time length of conduction period is delivered to the light-emitting unit for performing a dimming work of the second illumination mode; and wherein the external control unit is a push button device, a voltage divider or a wireless remote control receiver.

31. The two-level LED security light according to claim 20, wherein the power supply unit outputs at least one DC power for operating the two-level security light;
wherein the first set of the light-emitting unit and the second set of the light-emitting unit are connected in parallel, wherein the first switching device is electrically connected in series between the first set of the light-emitting unit and the power supply unit, wherein the second switching device is electrically connected in series between the second set of the light-emitting unit and the power supply unit;
wherein when the first illumination mode is performed, the controller outputs a control signal to control a conduction rate of the first switching device to deliver an electric power to at least the first set of the light-emitting unit for performing the first illumination mode; wherein when the second illumination mode is performed, the controller outputs at least one control signal to control at least a conduction rate of the second switching device to deliver an electric power to the second set of the light-emitting unit for performing the second illumination mode;
wherein the N number LEDs of the first set of the light-emitting unit and the M number LEDs of the second set of the light-emitting unit are respectively designed with an adequate configuration of in series and/or in parallel connections such that when incorporated with an adequate level of the at least one DC power an electric current passing through each LED of the M number LEDs and each LED of the N number LEDs remains at an adequate level such that a voltage V across each LED complies with an operating constraint of $V_{th} < V < V_{max}$ featuring electrical characteristics of a LED, wherein $V_{th}$ is a threshold voltage required to trigger the LED to start emitting light and $V_{max}$ is a maximum operating voltage across each LED to avoid an effect of a thermal runaway which results in burning out the LED or damaging an LED construction resulting in a shortened LED lifetime.

32. The two-level LED security light according to claim 31, wherein when the light-emitting unit is in the first illumination mode with the first set of the light-emitting unit being in a conduction state, the first light intensity of the first illumination mode is further adjustable by the external control unit;
wherein when the controller receives an external control signal from the external control unit, the controller operates to output a PWM signal to adjust the time length of conduction period of the first switching device in each duty cycle of the PWM signal such that an average electric current proportional to the time length of conduction period is delivered to the first set of the light-emitting unit for performing a dimming work of the first illumination mode.

33. The two-level LED security light according to claim 31, wherein when the light emitting unit is in the second illumination mode with at least the second set of the light-emitting unit being in a conduction state, the second light intensity of the second illumination mode is further adjustable by the external control unit;
wherein when the controller receives an external control signal from the external control unit, the controller outputs a PWM signal to control a time length of conduction period of the second switching device in each duty cycle of the PWM signal such that an average electric power proportional to the time length of conduction period is delivered to the second set of the light-emitting unit for performing a dimming work of the second illumination mode.

34. The two-level LED security light according to claim 31, wherein when the light-emitting unit is in the second illumination mode, a light intensity of the first set of the light-emitting unit and a light intensity of the second set of the light-emitting unit are respectively adjustable to tune a mingled color temperature thru a light diffuser; wherein upon receiving an external control signal from the external control unit the controller operates to simultaneously but reversely adjust the light intensity of the first set of the light-emitting unit and the light intensity of the second set of the light-emitting unit;
wherein for changing to a lower mingled color temperature, the controller upon receiving a first related external control signal operates to increase the conduction rate of the first switching device to increase the electric power delivered to the first set of the light-emitting unit and at the same time operates to proportionally decrease the conduction rate of the second switching device to decrease the electric power delivered to the second set of the light-emitting unit;
wherein for changing to a higher mingled color temperature, the controller upon receiving a second related external control signal operates to decrease the conduction rate of the first switching device to decrease the electric power delivered to the first set of the light-emitting unit and at the same time operates to proportionally increase the conduction rate of the second switching device to increase the electric power delivered to the second set of the light-emitting unit.

35. The two-level LED security light according to claim 34, wherein the controller is programmed with a color temperature tuning scheme, wherein paired combinations of different light intensities between operating the first set of the light-emitting unit and operating the second set of the light-emitting unit for creating different mingled color temperatures are preprogrammed and stored in a memory unit addressable by the controller for selection according to the external control signal received and interpreted by the controller for performing selected mingled color temperature.

36. The two-level LED security light according to claim 35, wherein the external control unit is a power interruption detection circuitry electrically coupled to the controller for detecting a short power interruption signal; wherein when the short power interruption signal is detected, the controller operates to alternately switch a selection of different color temperatures according to the color temperature tuning scheme preprogrammed.

37. The two level LED security light according to claim 35, wherein the external control unit is a voltage divider and the external control signal is a voltage output of the voltage divider set by a user for selecting a color temperature performance of the color temperature tuning scheme.

38. The two-level LED security light according to claim 34, wherein the external control unit is a voltage divider and the external control signal is a voltage output of the voltage divider set by a user.

39. The two-level LED security light according to claim 34, wherein the external control unit is a push button and the external control signal is a voltage signal with a time length corresponding to a time duration of the push button being operated by an user.

40. The two-level LED security light according to claim 34, wherein the external control unit is a wireless remote control receiver and the external control signal is an RF signal transmitted from a wireless mobile device.

41. The two-level LED security light according to claim 34, wherein in tuning the mingled color temperature the controller operates to simultaneously but reversely adjust the light intensity of the first set of the light-emitting unit and the light intensity of the second set of the light-emitting unit with an arrangement that a total wattage performance of the light emitting unit is kept unchanged during adjusting process.

42. The two level LED security light according to claim 20, wherein the external control unit is a power interruption detection circuitry electrically coupled to the controller for detecting a short power interruption signal; wherein when the short power interruption signal is detected, the controller operates to alternately perform one of the first illumination mode and the second illumination mode, wherein in the first illumination mode the motion sensing unit is temporarily deactivated, and wherein in the second illumination mode the motion sensing unit is activated.

43. A two-level LED security light comprising:
a light-emitting unit;
a loading and power control unit;
a light sensing control unit;
a power supply unit; and
at least one external control unit;
wherein the light-emitting unit comprises a plurality of LEDs divided into two sets of LEDs with a first set of the light-emitting unit having N number LEDs and a second set of the light-emitting unit having M number LEDs, wherein N and M are positive integers; wherein the N number LEDs are of a low color temperature while the M number LEDs are of a high color temperature;
wherein the loading and power control unit comprises a controller and a switching circuitry, wherein the controller is electrically coupled to the light sensing control unit, the switching circuitry and the at least one external control unit;
wherein the switching circuitry is electrically coupled between at least one power source of the power supply unit and the first set of the light-emitting unit and the second set of the light-emitting unit;
wherein the switching circuitry is controlled by the controller to perform at least respectively a first switching mode and a second switching mode according to signals respectively received from the light sensing control unit, and the at least one external control unit;
wherein in the first switching mode at least the first set of the light-emitting unit is turned on to perform a first illumination mode and in the second switching mode at least the second set of the light-emitting unit is turned on to perform a second illumination mode;

wherein when an ambient light detected by the light sensing control unit is lower than a first predetermined value, the loading and power control unit manages to perform at least one of the first switching mode and the second switching mode for performing at least one of the first illumination mode and the second illumination mode;

wherein when the ambient light detected by the light sensing control unit is higher than a second predetermined value, the loading and power control unit manages to turn off all the LEDs in the light-emitting unit;

wherein the at least one external control unit is electrically coupled to the controller for adjusting at least one operating parameter of a light intensity of the first illumination mode, a light intensity of the second illumination mode, a color temperature of the first illumination mode or a color temperature of the second illumination mode, or for switching from the first illumination mode to the second illumination mode; and wherein the N number LEDs of the first set of the light-emitting unit and the M number LEDs of the second set of the light-emitting unit are respectively designed with a configuration of in series and/or in parallel connections such that when incorporated with an adequate setting of the at least one power source an electric current passing through each LED of the M number LEDs and each LED of the N number LEDs remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across each LED to avoid an effect of a thermal runaway which results in burning out the LED or damaging an LED construction resulting in a shortened LED lifetime.

44. The two-level LED security light according to claim 43, wherein the external control unit is a power interruption detection circuitry electrically coupled to the controller for detecting a short power interruption signal;
wherein when the short power interruption signal is detected, the controller operates to alternately perform one of the first illumination mode and the second illumination mode; wherein the first illumination mode is a low level illumination mode with the low color temperature and the second illumination mode is a high level illumination mode with the high color temperature.

45. The two-level LED security light according to claim 43, wherein the external control unit is a power interruption detection circuitry electrically coupled to the controller for detecting a short power interruption signal; wherein when the short power interruption signal is detected, the controller operates to alternately perform at least one of a first illumination mode, a second illumination mode and a third illumination mode; wherein when the first illumination mode is performed, the loading and power control unit manages to turn on only the first set of the light-emitting unit, wherein when the second illumination mode is performed, the loading and power control unit manages to turn on only the second set of the light-emitting unit, wherein when the third illumination mode is performed, the loading and power control unit manages to turn on the first set of the light-emitting unit with a reduced illumination by decreasing an electric power delivered to the first set of the light-emitting unit.

46. The two level LED security light according to claim 43, wherein the external control unit is a power interruption detection circuitry electrically coupled to the controller for detecting a short power interruption signal;

wherein when the short power interruption signal is detected, the controller operates to alternately perform at least one of a first illumination mode, a second illumination mode and a third illumination mode; wherein when the first illumination mode is performed, the loading and power control unit manages to turn on only the first set of the light-emitting unit to perform the low level illumination mode emitting light with the low color temperature, wherein when the second illumination mode is performed, the loading and power control unit manages to turn on only the second set of the light-emitting unit to perform the high level illumination mode emitting light with the high color temperature; wherein when the third illumination mode is performed, the loading and power control unit manages to turn on both the first set of the light-emitting unit and the second set of the light-emitting unit respectively at reduced illumination levels such that the light-emitting unit accordingly performs a medium mingled color temperature.

47. The two level LED security light according to claim 43, wherein the external control switch is a slide switch for selecting one performance of the first illumination mode or the second illumination mode.

48. A two-level LED security light comprising:
a light-emitting unit having a plurality of LEDs configured with a first LED lighting load for emitting light with a low color temperature, a second LED lighting load for emitting light with a high color temperature and a diffuser covering the first LED lighting load and the second LED lighting load to create a diffused light with a mingled color temperature;
a loading and power control unit;
a light sensing control unit;
a motion sensing unit;
a power supply unit; and
at least one external control unit;
wherein the loading and power control unit comprises a controller and a switching circuitry, wherein the controller is electrically and respectively coupled with the light sensing control unit, the motion sensing unit, the switching circuitry and the at least one external control unit;
wherein the switching circuitry is electrically coupled between a power source of the power supply unit and the light-emitting unit, wherein the power source is a DC power source configured in the power supply unit;
wherein the switching circuitry comprises at least one unidirectional semiconductor switching device;
wherein the first LED lighting load and the second LED lighting load are connected in parallel and are further respectively and electrically coupled to the switching circuitry;
wherein the controller outputs control signals to control different conduction rates of the switching circuitry for delivering different average electric powers from the power source respectively to the first LED lighting load and the second LED lighting load of the light emitting unit such that the light-emitting unit respectively generates illuminations of different light intensities and different mingled color temperatures for performing different illumination modes according to signals respectively received from the light sensing control unit, the motion sensing unit and the at least one external control unit;
wherein when an ambient light detected by the light sensing control unit is lower than a first predetermined value, at least the first LED lighting load being controlled by the light sensing control unit is switched on; wherein the controller outputs at least a first control signal to control at least a first conduction rate of the switching circuitry such that a low electric power is delivered to the light emitting unit to perform a low level illumination mode emitting light with a low light intensity and a low mingled color temperature;
wherein when the ambient light detected by the light sensing control unit is higher than a second predetermined value, the light-emitting unit including the first LED lighting load and the second LED lighting load being controlled by the light sensing control unit is switched off;
wherein when a motion signal is detected by the motion sensing unit, at least the second LED lighting load is switched on by the loading and power control unit, wherein the controller outputs at least a second control signal to control at least a second conduction rate of the switching circuitry such that a high electric power is delivered to the light emitting unit to perform a high level illumination mode emitting light with a high light intensity and a high mingled color temperature for a predetermined time duration before switching back to the low level illumination mode;
wherein the at least one external control unit generates at least one external control signal for adjusting or selecting at least one operating parameter including the light intensity of the low level illumination mode, the mingled color temperature of the low level illumination mode, the light intensity of the high level illumination mode, the mingled color temperature of the high level illumination mode and a time length of the predetermined time duration;
wherein the LEDs of the first LED lighting load and the LEDs of the second LED lighting load are respectively designed with a configuration of in series and/or in parallel connections such that when incorporated with an adequate setting of the power source an electric current passing through each LED of the first LED lighting load and each LED of the second LED lighting load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across each LED to avoid an effect of a thermal runaway which results in burning out the LED or damaging an LED construction resulting in a shortened LED lifetime.

49. The two-level LED security light according to claim 48, wherein when the light emitting unit is in the high level illumination mode, the light intensity of the first LED lighting load and the light intensity of the second LED lighting load are respectively adjustable to tune the mingled color temperature of the diffused light created through the light diffuser; wherein upon receiving the external control signal from the at least one external control unit the controller operates in response to simultaneously but reversely adjust the light intensity of the first LED lighting load and the light intensity of the second LED lighting load with the same pace;

wherein for changing to a lower mingled color temperature, the controller upon receiving the external control signal operates to control the switching circuitry to increase an electric power delivered to the first LED lighting load and at the same time proportionally decrease the electric power delivered to the second LED lighting load;

wherein for changing to a higher mingled color temperature, the controller upon receiving the external control signal operates to control the switching circuitry to decrease the electric power delivered to the first LED lighting load and at the same time proportionally increase the electric power delivered to the second LED lighting load.

50. The two-level LED security light according to claim 49, wherein the controller is programmed with a color temperature tuning scheme, wherein paired combinations of different light intensities between operating the first LED lighting load and operating the second LED lighting load for creating different mingled color temperatures are preprogrammed and stored in a memory unit addressable by the controller for operating a pick and play process according to the external control signal received and interpreted by the controller for performing a selected mingled color temperature.

51. The two-level LED security light according to claim 49, wherein in tuning the mingled color temperature the controller operates to simultaneously but reversely adjust the light intensity of the first LED lighting load and the light intensity of the second LED lighting load with an arrangement that a total wattage performance of the light emitting unit is kept unchanged during adjusting process.

52. The two-level LED security light according to claim 48 wherein the at least one external control unit includes at least one voltage divider and the external control signal is a voltage output of the voltage divider set by a user.

53. The two-level LED security light according to claim 48, wherein the at least one external control unit includes at least one push button or one touch pad and the external control signal is a voltage signal with a time length corresponding to a time duration of the push button or the touch pad being operated by a user.

54. The two-level LED security light according to claim 48, wherein the at least one external control unit is a wireless remote control receiver and the external control signal is a wireless signal transmitted from a mobile device.

55. The two-level LED security light according to claim 48, wherein when the light-emitting unit is in the low level illumination mode, the light intensity of the first LED lighting load and the light intensity of the second LED lighting load are respectively adjustable to tune the mingled color temperature thru the light diffuser; wherein upon receiving the external control signal from the external control unit the controller operates to simultaneously but reversely adjust the light intensity of the first LED lighting load and the light intensity of the second LED lighting load;

wherein for changing to a lower mingled color temperature, the controller upon receiving the external control signal operates to control the switching circuitry to increase the electric power delivered to the first LED lighting load and at the same time proportionally decrease the electric power delivered to the second LED lighting load;

wherein for changing to a higher mingled color temperature, the controller upon receiving the external control signal operates to control the switching circuitry to decrease the electric power delivered to the first LED lighting load and at the same time proportionally increase the electric power delivered to the second LED lighting load.

56. The two-level LED security light according to claim 55, wherein the controller is programmed with a color temperature tuning scheme, wherein paired combinations of different light intensities between operating the first LED lighting load and operating the second LED lighting load for creating different mingled color temperatures are preprogrammed and stored in a memory unit addressable by the controller for operating a pick and play process according to the external control signal received and interpreted by the controller for performing a selected mingled color temperature.

57. A lifestyle LED security light comprising:
a light-emitting unit, configured with a first LED lighting load for emitting light with a low color temperature, a second LED lighting load for emitting light with a high color temperature and a diffuser covering the first LED lighting load and the second LED lighting load to create a diffused light with a mingled color temperature;
a loading and power control unit;
a light sensing control unit;
a motion sensing unit;
a power supply unit; and
at least one external control unit;
wherein the loading and power control unit comprises a controller and a switching circuitry, wherein the controller is electrically and respectively coupled with the light sensing control unit, the motion sensing unit, the switching circuitry and the at least one external control unit ;
wherein the switching circuitry comprises at least a first semiconductor switching device and a second semiconductor switching device;
wherein the first LED lighting load and the second LED lighting load are connected in parallel and are further respectively and electrically coupled to the first semiconductor switching device and the second semiconductor switching device;
wherein the controller outputs a first control signal to control a first conduction rate of the first semiconductor switching device for delivering a first electric power to the first LED lighting load and simultaneously a second control signal to control a second conduction rate of the second semiconductor switching device for delivering a second electric power to the second LED lighting load such that the light-emitting unit respectively generates illuminations of different light intensities and different mingled color temperatures for performing different illumination modes according to signals respectively received from the light sensing control unit, the motion sensing unit and the at least one external control unit;
wherein when an ambient light detected by the light sensing control unit is lower than a first predetermined value, the light-emitting unit being controlled by the light sensing control unit is switched on to perform a first illumination mode with the motion sensing unit being temporarily deactivated; wherein the controller outputs at least the first control signal to control at least the first conduction rate of at least the first semiconductor switching device such that a total electric power is delivered to the light-emitting unit to perform the first illumination mode with a first level illumination characterized with a first light intensity and a first mingled color temperature for a first predetermined time duration;

wherein upon a maturity of the first predetermined time duration the loading and power control unit manages to cutoff the total electric power delivered to the light-emitting unit and at the same time the motion sensing unit is activated;

wherein when a motion signal is detected by the motion sensing unit, the controller operates to output at least the second control signal to increase at least the second conduction rate of at least the second semiconductor switching device to increase the total electric power delivered to the light emitting unit to perform a second illumination mode with a second level illumination characterized with a second light intensity and a second mingled color temperature for a second predetermined time duration before being switched back to a turned off state, wherein the second light intensity of the second level illumination is equal to or higher than the first light intensity of the first level illumination;

wherein when the ambient light detected by the light sensing control unit is higher than a second predetermined value, the light-emitting unit including the first LED lighting load and the second LED lighting load being controlled by the light sensing control unit is switched off;

wherein the at least one external control unit generates at least one external control signal for adjusting or selecting at least one operating parameter of the light intensity, the mingled color temperature, a time length for the first predetermined time duration or the second predetermined time duration of the light-emitting unit in the first illumination mode or in the second illumination mode;

wherein the LEDs of the first LED lighting load and the LEDs of the second LED lighting load are respectively designed with a configuration of in series and/or in parallel connections such that when incorporated with an adequate setting of a power source of the power supply unit an electric current passing through each LED of the first LED lighting load and each LED of the second LED lighting load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across each LED to avoid an effect of a thermal runaway which results in burning out the LED or damaging an LED construction resulting in a shortened LED lifetime.

58. The lifestyle LED security light according to claim 57, wherein the first mingled color temperature of the first level illumination in performing the first illumination mode is the low color temperature, wherein the second semiconductor switching device is in a cutoff state and the controller outputs only the first control signal to control the first conduction rate of the first semiconductor switching device to deliver the total electric power to the light emitting unit to determine the light intensity of the first illumination mode.

59. The lifestyle LED security light according to claim 57, wherein the second mingled color temperature of the second level illumination in performing the second illumination mode is the high color temperature, wherein the first semiconductor switching device is in a cutoff state and the controller outputs only the second control signal to control the second conduction rate of the second semiconductor switching device to deliver the total electric power to the light emitting unit to determine the light intensity of the second illumination mode.

60. The lifestyle LED security light according to claim 57, wherein when the light-emitting unit is in the first illumination mode, a light intensity of the first LED lighting load and a light intensity of the second LED lighting load are respectively adjustable to tune the mingled color temperature of the diffused light created thru the light diffuser; wherein upon receiving an external control signal from the external control unit the controller operates to simultaneously but reversely adjust the light intensity of the first LED lighting load and the light intensity of the second LED lighting load with the same pace;

wherein for changing to a lower mingled color temperature, the controller upon receiving the external control signal operates to control the first semiconductor switching device to increase the first electric power delivered to the first LED lighting load and at the same time proportionally decrease the second electric power delivered to the second LED lighting load;

wherein for changing to a higher mingled color temperature, the controller upon receiving the external control signal operates to control the first semiconductor switching device to decrease the first electric power delivered to the first LED lighting load and at the same time proportionally increase the second electric power delivered to the second LED lighting load.

61. The lifestyle LED security light according to claim 60, wherein when the light-emitting unit is in the first illumination mode, the controller is programmed with a color temperature tuning scheme, wherein paired combinations of different light intensities between operating the first LED lighting load and operating the second LED lighting load for creating different mingled color temperatures are preprogrammed and stored in a memory unit addressable by the controller for operating a pick and play process according to the external control signal received and interpreted by the controller for performing a selected mingled color temperature.

62. The lifestyle LED security light according to claim 57, wherein when the light-emitting unit is in the second illumination mode, a light intensity of the first LED lighting load and a light intensity of the second LED lighting load are respectively adjustable to tune the mingled color temperature thru the light diffuser; wherein upon receiving an external control signal from the external control unit the controller operates to simultaneously but reversely adjust the light intensity of the first LED lighting load and the light intensity of the second LED lighting load with the same pace;

wherein for changing to a lower mingled color temperature, the controller upon receiving the external control signal operates to control the first semiconductor switching device to increase the first electric power delivered to the first LED lighting load and at the same time operates to control the second semiconductor switching device to proportionally decrease the second electric power delivered to the second LED lighting load;

wherein for changing to a higher mingled color temperature, the controller upon receiving the external control signal operates to control the first semiconductor switching device to decrease the first electric power delivered to the first LED lighting load and at the same time operates to control the second semiconductor switching device to proportionally increase the second electric power delivered to the second LED lighting load.

63. The lifestyle LED security light according to claim 62, wherein when the light-emitting unit is in the second illumination mode, the controller is programmed with a color temperature tuning scheme, wherein paired combinations of different light intensities between operating the first LED lighting load and operating the second LED lighting load for creating different mingled color temperatures are preprogrammed and stored in a memory unit addressable by the controller for operating a pick and play process according to the external control signal received and interpreted by the controller for performing a selected mingled color temperature.

64. The lifestyle LED security light according to claim 57, wherein the at least one external control unit includes at least one voltage divider operated by a user to output a voltage signal for adjusting or selecting the light intensity, the mingled color temperature or a time length for the first predetermined time duration or the second predetermined time duration of the light-emitting unit in the first illumination mode or in the second illumination mode.

65. The lifestyle LED security light according to claim 57, wherein the at least one external control unit includes at least one push button or one touch pad to output a voltage signal with a time length corresponding to a time duration that the push button or the touch pad being operated by a user for adjusting or selecting the light intensity, the mingled color temperature or a time length for the first predetermined time duration or the second predetermined time duration of the light emitting unit respectively in the first illumination mode or in the second illumination mode.

66. The lifestyle LED security light according to claim 57, wherein the at least one external control unit includes at least one wireless signal receiver to receive a wireless signal from a mobile device for adjusting or selecting the light intensity, the mingled color temperature or a time length for the first predetermined time duration or the second predetermined time duration of the light emitting unit respectively in the first illumination mode or the second illumination mode.

67. A lifestyle LED security light comprising:
a light-emitting unit, configured with a first LED lighting load for emitting light with a low color temperature, a second LED lighting load for emitting light with a high color temperature and a diffuser covering the first LED lighting load and the second LED lighting load to create a diffused light with a mingled color temperature;
a loading and power control unit;
a light sensing control unit;
a motion sensing unit;
a power supply unit; and
at least one external control unit;
wherein the loading and power control unit comprises a controller and a switching circuitry, wherein the controller is electrically and respectively coupled with the light sensing control unit, the motion sensing unit, the switching circuitry and the at least one external control unit ;
wherein the switching circuitry comprises at least a first semiconductor switching device and a second semiconductor switching device;
wherein the first LED lighting load and the second LED lighting load are connected in parallel and are further respectively and electrically coupled to the first semiconductor switching device and the second semiconductor switching device;
wherein the controller outputs a first control signal to control a first conduction rate of the first semiconductor switching device for delivering a first electric power to the first LED lighting load and simultaneously a second control signal to control a second conduction rate of the second semiconductor switching device for delivering a second electric power to the second LED lighting load such that the light-emitting unit respectively generates illuminations of different light intensities and different mingled color temperatures for performing different illumination modes according to signals respectively received from the light sensing control unit, the motion sensing unit and the at least one external control unit;
wherein when an ambient light detected by the light sensing control unit is lower than a first predetermined value, the light-emitting unit being controlled by the light sensing control unit is switched on to perform a first illumination mode with the motion sensing unit being temporarily deactivated; wherein the controller outputs at least the first control signal to control at least the first conduction rate of at least the first semiconductor switching device such that a total electric power is delivered to the light-emitting unit to perform the first illumination mode with a first level illumination characterized with a first light intensity and a first mingled color temperature for a first predetermined time duration;
wherein upon a maturity of the first predetermined time duration the loading and power control unit manages to reduce the total electric power delivered to the light-emitting unit to generate a low level illumination characterized by a low light intensity and at the same time the motion sensing unit is activated;
wherein when a motion signal is detected by the motion sensing unit, the controller operates to output at least the second control signal to increase at least the second conduction rate of at least the second semiconductor switching device to increase the total electric power delivered to the light emitting unit to perform a second illumination mode with a second level illumination characterized by a second light intensity and a second mingled color temperature for a second predetermined time duration before being switched back to the low level illumination, wherein the second light intensity of the second level illumination is equal to or higher than the first light intensity of the first level illumination, wherein the first light intensity is equal to or higher than the low light intensity of the low level illumination;
wherein when the ambient light detected by the light sensing control unit is higher than a second predetermined value, the light-emitting unit including the first LED lighting load and the second LED lighting load being controlled by the light sensing control unit is switched off;
wherein the at least one external control unit generates at least one external control signal for adjusting or selecting at least one operating parameter of the light intensity, the mingled color temperature or a time length for the first predetermined time duration or the second predetermined time duration of the light-emitting unit in the first illumination mode or in the second illumination mode;

wherein the LEDs of the first LED lighting load and the LEDs of the second LED lighting load are respectively designed with a configuration of in series and/or in parallel connections such that when incorporated with an adequate setting of a power source of the power supply unit an electric current passing through each LED of the first LED lighting load and each LED of the second LED lighting load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across each LED to avoid an effect of a thermal runaway which results in burning out the LED or damaging an LED construction resulting in a shortened LED lifetime.

68. The lifestyle LED security light according to claim 67, wherein the first mingled color temperature in performing the first illumination mode is the low color temperature, wherein the second semiconductor switching device is in a cutoff state and the controller outputs only the first control signal to control the first conduction rate of the first semiconductor switching device to deliver the total electric power to the light emitting unit to determine the light intensity of the first illumination mode.

69. The lifestyle LED security light according to claim 67, wherein the second mingled color temperature in performing the second illumination mode is the high color temperature, wherein the first semiconductor switching device is in a cutoff state and the controller outputs only the second control signal to control the second conduction rate of the second semiconductor switching device to deliver the total electric power to the light emitting unit to determine the light intensity of the second illumination mode.

70. The lifestyle LED security light according to claim 67, wherein when the light-emitting unit is in the first illumination mode, a light intensity of the first LED lighting load and a light intensity of the second LED lighting load are respectively adjustable to tune the mingled color temperature of the diffused light created thru the light diffuser; wherein upon receiving an external control signal from the at least one external control unit the controller operates to simultaneously but reversely adjust the light intensity of the first LED lighting load and the light intensity of the second LED lighting load with the same pace;

wherein for changing to a lower mingled color temperature, the controller upon receiving the external control signal operates to control the first semiconductor switching device to increase the first electric power delivered to the first LED lighting load and at the same time proportionally decrease the second electric power delivered to the second LED lighting load;

wherein for changing to a higher mingled color temperature, the controller upon receiving the external control signal operates to control the first semiconductor switching device to decrease the first electric power delivered to the first LED lighting load and at the same time proportionally increase the second electric power delivered to the second LED lighting load.

71. The lifestyle LED security light according to claim 70, wherein when the light-emitting unit is in the first illumination mode, the controller is programmed with a color temperature tuning scheme, wherein paired combinations of different light intensities between operating the first LED lighting load and operating the second LED lighting load for creating different mingled color temperatures are preprogrammed and stored in a memory unit addressable by the controller for operating a pick and play process according to the external control signal received and interpreted by the controller for performing a selected mingled color temperature.

72. The lifestyle LED security light according to claim 67, wherein when the light-emitting unit is in the second illumination mode, a light intensity of the first LED lighting load and a light intensity of the second LED lighting load are respectively adjustable to tune the mingled color temperature thru the light diffuser; wherein upon receiving an external control signal from the at least one external control unit the controller operates to simultaneously but reversely adjust the light intensity of the first LED lighting load and the light intensity of the second LED lighting load with the same pace;

wherein for changing to a lower mingled color temperature, the controller upon receiving the external control signal operates to control the first semiconductor switching device to increase the first electric power delivered to the first LED lighting load and at the same time operates to control the second semiconductor switching device to proportionally decrease the second electric power delivered to the second LED lighting load;

wherein for changing to a higher mingled color temperature, the controller upon receiving the external control signal operates to control the first semiconductor switching device to decrease the first electric power delivered to the first LED lighting load and at the same time operates to control the second semiconductor switching device to proportionally increase the second electric power delivered to the second LED lighting load.

73. The lifestyle LED security light according to claim 72, wherein when the light-emitting unit is in the second illumination mode, the controller is programmed with a color temperature tuning scheme, wherein paired combinations of different light intensities between operating the first LED lighting load and operating the second LED lighting load for creating different mingled color temperatures are preprogrammed and stored in a memory unit addressable by the controller for operating a pick and play process according to the external control signal received and interpreted by the controller for performing a selected mingled color temperature.

74. The lifestyle LED security light according to claim 67, wherein the at least one external control unit includes at least one voltage divider operated by a user to output a voltage signal for adjusting or selecting the light intensity, the mingled color temperature or a time length for the first predetermined time duration or the second predetermined time duration of the light-emitting unit in the first illumination mode or in the second illumination mode.

75. The lifestyle LED security light according to claim 67, wherein the at least one external control unit includes at least one push button or one touch pad to output a voltage signal with a time length corresponding to a time duration that the push button or the touch pad being operated by a user for adjusting or selecting the light intensity, the mingled color temperature or a time length for the first predetermined time duration or the second predetermined time duration of the light emitting unit respectively in the first illumination mode or in the second illumination mode.

76. The lifestyle LED security light according to claim 67, wherein the at least one external control unit includes at least one wireless signal receiver to receive a wireless signal from a mobile device for adjusting or selecting the light intensity, the mingled color temperature or a time length for the first predetermined time duration or the second predetermined time duration of the light emitting unit respectively in the first illumination mode or the second illumination mode.

* * * * *